(12) United States Patent
Qi et al.

(10) Patent No.: US 8,120,795 B2
(45) Date of Patent: Feb. 21, 2012

(54) METHOD OF DOCUMENT PROTECTION

(75) Inventors: Wenfa Qi, Beijing (CN); Jiquan Xie, Beijing (CN); Bin Yang, Beijing (CN); Xiaohong Ding, Beijing (CN); Jiang Deng, Beijing (CN)

(73) Assignees: Peking University Founder Group Co., Ltd.;, Beijing (CN); Beijing Founder Electronics Co., Ltd.;, Beijing (CN); Peking University, Beijing (CN)

( * ) Notice: Subject to any disclaimer, the term of this patent is extended or adjusted under 35 U.S.C. 154(b) by 1024 days.

(21) Appl. No.: 11/991,394

(22) PCT Filed: Apr. 29, 2006

(86) PCT No.: PCT/CN2006/000855
§ 371 (c)(1),
(2), (4) Date: Mar. 3, 2008

(87) PCT Pub. No.: WO2007/025423
PCT Pub. Date: Mar. 8, 2007

(65) Prior Publication Data
US 2009/0257076 A1 Oct. 15, 2009

(51) Int. Cl.
*G06F 15/00* (2006.01)
*G06K 9/00* (2006.01)
(52) U.S. Cl. ........................ 358/1.14; 382/100
(58) Field of Classification Search ................. 358/1.14, 358/1.15
See application file for complete search history.

(56) References Cited

U.S. PATENT DOCUMENTS

| | | |
|---|---|---|
| 5,604,596 A | 2/1997 | Ukai et al. |
| 6,091,841 A | 7/2000 | Rogers et al. |
| 2003/0068069 A1 | 4/2003 | Suzuki |
| 2003/0142331 A1 | 7/2003 | Tanaka |
| 2005/0052682 A1 | 3/2005 | Ishikawa et al. |

(Continued)

FOREIGN PATENT DOCUMENTS

CN 1264096 A 8/2000

(Continued)

OTHER PUBLICATIONS

Oraintara, Soontorn et al., Integer Fast Fourier Transform, IEEE, Transactions on Signal Processing, Mar. 2002, vol. 50, No. 3, pp. 607-618.

(Continued)

*Primary Examiner* — Saeid Ebrahimi Dehkordy
(74) *Attorney, Agent, or Firm* — Lowe, Hauptman, Ham & Berner LLP

(57) ABSTRACT

This invention relates to a method for preventing a copy of document, belonging to a technical field of entire copy protection of document. In the prior art, for some important documents, specially the secret ones, the reproduction of this kind of document is usually prohibited by its owner because of the security. But the technique in the prior art can not solve the problem of preventing unauthorized reproduction. The method of the present invention is intended to embed a shading pattern under the original image of anti-copy document by an application program installed in the copy device, and decide whether the document can be copied legally or not. By the method of present invention, it is possible to detect the watermark information of the anti-copy document accurately and quickly, and prevent the reproduction of the anti-copy document thoroughly. Moreover, an additional memory space is no need.

23 Claims, 4 Drawing Sheets

U.S. PATENT DOCUMENTS

2005/0078331 A1* 4/2005 Guan et al. .................... 358/1.14
2006/0033956 A1* 2/2006 Takahashi .................... 358/1.15

FOREIGN PATENT DOCUMENTS

| | | |
|---|---|---|
| JP | 10157276 | 6/1998 |
| JP | 11215369 | 8/1999 |
| JP | 2000307857 | 11/2000 |
| JP | 2001320582 | 11/2001 |
| JP | 2004-274092 | 9/2004 |
| WO | WO9822292 | 5/1998 |
| WO | WO2005/036459 | 4/2005 |

OTHER PUBLICATIONS

Supplementary European Search Report dated Jan. 26, 2009.

* cited by examiner

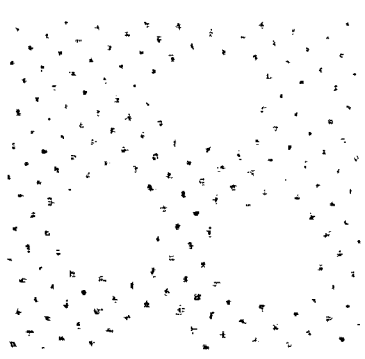
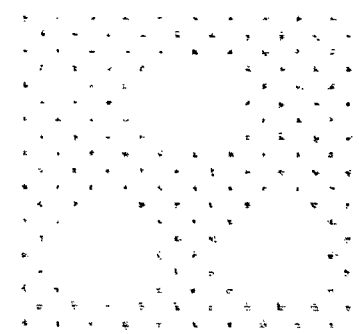
Fig. 5  Fig. 6
```
********1*********   ********1*********
*******111********   *******111********
******11111*******   ******11111*******
*****111111*******   *****111111*******
****11111111******   ****11111111******
*1111111111*   *1111111111*****
11111111100111 11111111100111****
*111111110000111*** *111111110000111***
1110011110000l111**  1110011110000l111**
11000011110011111*   11000011110011111*
11000011111111111*   11000011111111111*
*11001111111111**    *11001111111111**
111111011111111* 111111011111111*
*111100001111  *111100001111****
****1110000111*****  ****1110000111*****
****111000111******  ****111000111******
******11111*******   ******11111*******
*******111********   *******111********
********1*********   ********1*********
```
Fig. 7  Fig. 8

US 8,120,795 B2

METHOD OF DOCUMENT PROTECTION

FIELD OF THE INVENTION

The present invention relates to a security document protection technology and, in particular, to a method of document protection.

BACKGROUND OF THE INVENTION

With the technologies of image process and digital imaging running up, various kinds of advanced digital color copying apparatus arise. Those digital imaging apparatus can copy financial notes, securities, important certificates, classified documents and so on with a high fidelity. As a result, it is very difficult to distinguish the original from the copy from time to time. The copy machine is a typical example. Modern copy machines possess a high ability to make high quality copies with advanced functionality, some of which possess an intelligent editing capability and realize communication with other peers. Some advanced copy machines can so much as make a copy of banknote. Such copy machines can copy various documents with high quality, which greatly reduces the work load of transcription and improves efficiency. However, this ability of the copy machines produces a problem for the security of important documents, that is, classified documents might be easily copied during transmission so as to lose the security. Then the copy machine becomes a convenient tool for leaking or stealing secrets. In recent years, most of the intercepted classified documents by the customs are copies. It has clearly shown the seriousness of the problem. The same risk is also carried with advanced scanners, facsimile machines, digital cameras, as well as other imaging apparatus with high definition. To resolve this problem, in addition to reinforcing management and control of the classified materials, the copy protection technology is necessary to be developed for classified materials so as to restrain the high-fidelity image copying function furthest.

A method is disclosed in the prior art, in which specific papers with copy-protected shade is used to prevent the classified documents from being copied. The additional digital watermark information is embedded in the original image data. Specifically, a layer of copy-protected shade is preprinted on the printing paper and the obscure words such as "Copy", "VOID" and "Copy Prohibit" are pre-embedded in the shade. When the document is unauthorizedly copied, those words stand out so that the copy can be distinguished clearly. Psychologically speaking, this method provides anti-counterfeiting to a certain degree, for example, a copy of a ticket or important material is easily identified by an examiner. However, for those classified documents, the emphasis is on the leak of the document, other than the warning on the copy. Therefore, such method does not fundamentally prevent the document from being copied.

In another method of the prior art, the specific marks which are printed on the classified documents and indicate the confidentiality are examined so as to identify the documents to be prevented from being copied. It is common that a classified document is printed with such specific marks to indicate its confidentiality. If it is easy for identification that the input original is a specific document, the classified documents are copy-protected. However, if a classified document has specific classified marks such as "classified", the document can be easily defeat by covering up those specific classified marks with a piece of paper. Therefore, this method still could not fully protect the classified documents.

Furthermore, there is another similar method: by using pattern matching, the input image data is compared with the pre-stored specific marks. The input image is concluded as a special document if the input image data matches a pre-stored specific mark. Therefore, the special documents, such as securities, currencies, and the like, can be recognized. This method requires pre-stored reference pattern data for the specific documents. However, in fact, it is very difficult to apply the reference pattern data of static data to a huge number of classified documents. Of course, other pattern matching solutions could be also used to protect classified documents. However, all the pattern matching solutions need a large hardware storage space for pre-storing reference patterns for basic units. The required hardware storage space increases with the increasing stored reference patterns for basic units. To prevent the classified documents from being copied at a turned angle, accordingly, it is necessary for the hardware storage to store the specific information of reference patterns at various angles for correctly identifying the documents with copy protection. Because the pattern matching technique is applied here, when the original protected document is enlarged or shrunk for copy, the hidden specific information cannot be identified correctly by using this method in many cases. Furthermore, the above method is very complicated, requires a large hardware storage space, and generally needs computer-accessible storage medium or special image-processing device to carry out. In such methods, received input images are obtained by a scanner, and then processed by specific devices. When an advanced copy machine is used to enlarge or shrink illegally classified documents for copying, those methods stated above become useless. Therefore, those methods still cannot fundamentally prevent the classified documents from being copied.

SUMMARY OF THE INVENTION

To overcome the shortcomings of the prior art, the present invention is to provide a copy protection method for documents. In the method, a watermark is embedded underneath the original image of the copy-protected document for fast scan and detection. The method is not restrained by the angle and enlargement/shrinkage for unauthorized copying of copy-protected documents. Moreover, the method is easy to implement and no extra hardware storage space is needed. The detection program is suitable for the application specific integrated circuit (ASIC) chip design for hardware. The mark in a copy-protected document can be detected in real-time during copy process, so as to fundamentally cut off unauthorized copying of copy-protected documents. This feature greatly improves the security of classified documents.

In order to accomplish the above object, the present invention provides a method of document protection, comprising:
(1) forming a layer of authentication shade underneath an original image of a copy-protected document;
(2) obtaining a digitized image file of the original document by a copy apparatus when the original document is copied;
(3) scanning the digitized image file to detect, by operating a program fixed in the copy apparatus, whether a watermark is included in the document; and
(4) prohibiting the document from being copied if the watermark is detected in the step (3); or copying the document if no watermark is detected and outputting the document through a hardware controller of the copy apparatus.

Further, to obtain better result for the present invention, the authentication shade includes a background pattern area and a mark area, the background pattern area is a halftone image, and the mark area is formed by repeating one mark on a whole page so that shapes and positions of the repeated marks constitute the watermark which is distributed in the copy-protected document and to be detected.

Further still, to obtain better result for the present invention, the background pattern area of the authentication shade is a halftone image with a gray level in a range of 3%~20%.

Further still, to obtain better result for the present invention, the background pattern area of the authentication shade is a halftone image with a halftone count in a range of 301 pi~901 pi.

Further, to obtain better result for the present invention, the copy apparatus includes a specialized imaging device with a resolution of 300 dpi, 400 dpi, 600 dpi or 1200 dpi.

Further, to obtain better result for the present invention, the program is fixed in the copy apparatus via an ASIC design, without needing a floating-point calculation and multiplication/division operation.

Further still, the step of scanning the digitized image file further comprises:
 a) selecting a bottom-left corner of a specific image as a starting point to start scanning;
 b) stopping detecting and concluding that no watermark exists in the document, if there is no dot detected;
 c) scanning a region around a dot if the dot is detected;
 d) stopping detecting and concluding that no watermark exists in the document if there are not four dots which are pairwise symmetrical about the detected dot;
 e) recording offset vectors between the detected dot and each of the four dots, respectively, if there are four dots which are pairwise symmetrical about the detected dot; and
 f) searching again for the starting point in the image and scanning the whole image in accordance with the four offset vectors, and then recording the detecting result in a storage cell.

A position of each pixel is calculated in accordance with the four offset vectors in the step (3), and the pixel is determined as a dot, a white point or another point according to a gray level of the pixel, each of which is represented by one of three different symbols and written in the storage cell.

The concluding step in step (4) further comprises:
 i) searching the storage cell for closed convex polygonal connected-zones formed by dots;
 ii) recording center positions of all convex polygonal connected-zones; and
 iii) identifying shapes of the convex polygonal connected-zones and positional relationship among the center positions to determine whether the watermark exists.

In the step (4), if the watermark exists, the hardware controller, instead of outputting the image file, outputs a destroyed image file, or the file attached with evidence of illegal copying. The evidence of illegal copying can be words such as "prohibit duplication", "illegal duplication", "illegal copy" and the like on the illegal duplicate.

The present invention has the following effects. The watermark in a copy-protected document can be detected fast and accurately so as to fundamentally cut off unauthorized copying of copy-protected documents. As a result, the security of the copy-protected classified documents is improved greatly. Moreover, the method is easy to implement and no extra hardware storage space is needed. According to the present invention, the method is suitable for copy machines, scanners, facsimile machines, digital cameras and other advanced imaging devices.

The effects mentioned above of the present invention are the result of the following reasons. (1) The copy-protected document according to the present invention has a large amount of mark information contained in its authentication shade. This provides the present invention with ability to resist the attack brought by words, tables, images and stains on the document, as well as by cutting of the document. (2) The method according to the present invention is easy to implement and no extra hardware storage space is needed. Moreover, it does not use floating-point calculation and multiplication/division operation and is suitable for ASIC chip design in hardware. (3) The pattern matching is not employed in the detection program of the present invention. Therefore, in addition to the reduction in the required hardware storage space, the present invention effectively prevents the impact of copying a document at an angle or copying after enlarging/shrinking the document. Furthermore, the detection program of the present invention is integrated in the hardware of copy apparatus. Thus the mark information hidden in a copy-protected document can be detected in real-time so as to fundamentally cut off unauthorized copying of copy-protected documents. This feature greatly improves the security of the copy-protected classified documents.

BRIEF DESCRIPTION OF THE DRAWINGS

FIG. 5 is an enlarged schematic view of a portion comprising one mark in a copy-protected document;

FIG. 6 is a schematic view of FIG. 5 turned by 10 degrees;

FIG. 7 is a schematic view of the array that is the result of scanning and detecting the area shown in FIG. 5;

FIG. 8 is a schematic view of the equilateral triangle formed by the centers of three circles identified from FIG. 7;

DESCRIPTION OF THE PREFERRED EMBODIMENTS

The present invention will be described with reference to the drawings and embodiments thereof.

Embodiment 1

Figure 13:
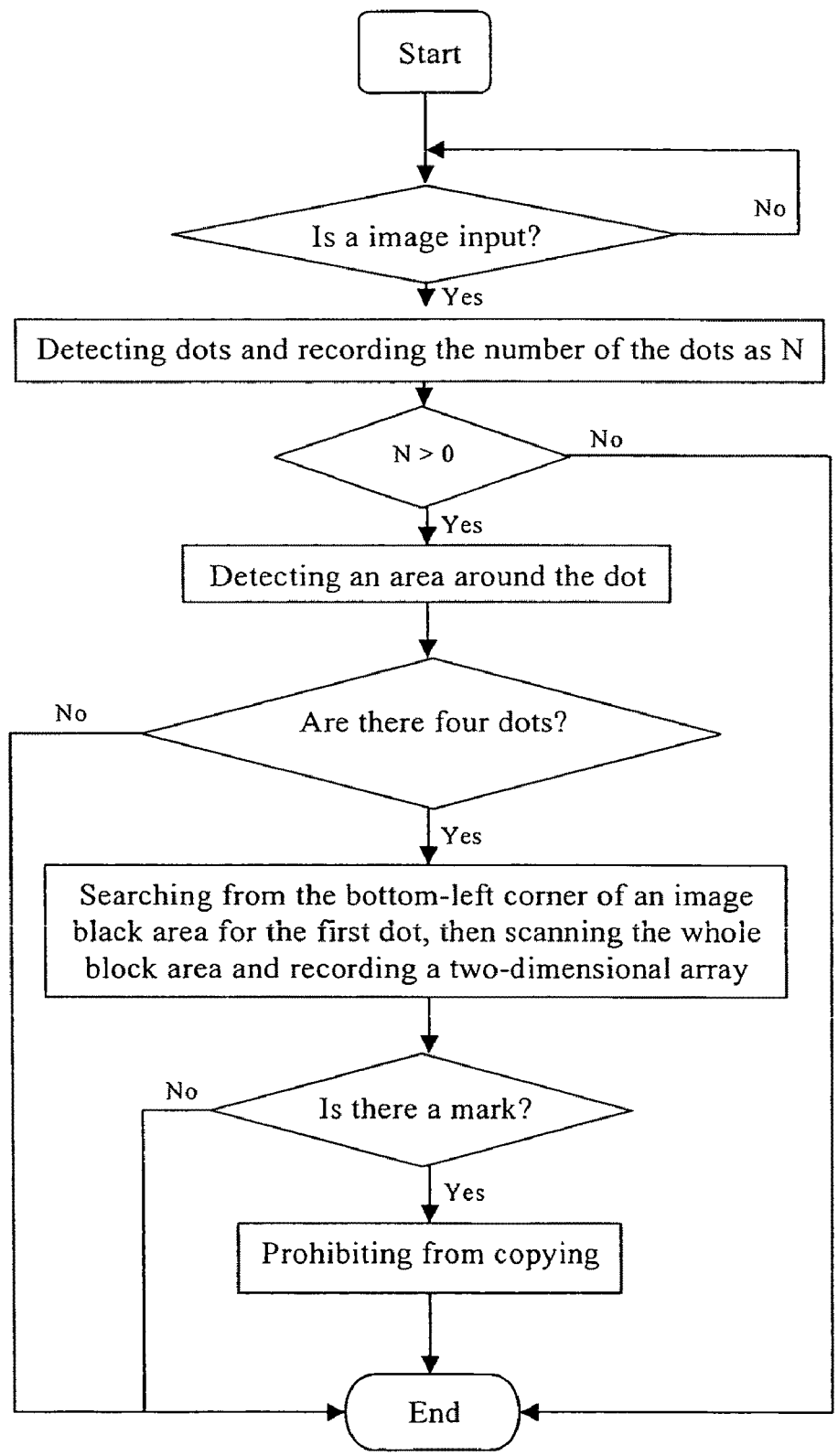
FIG. 13 is a flowchart showing an embodiment according to the present invention.

Referring to FIG. 13, a copy protection method for documents includes the following steps.

(1) A layer of authentication shade is formed underneath the original image of a copy-protected document. The authentication shade includes a background pattern area and a mark area. The shape and positional relationship of the marks constitute a watermark. The general documents allowed to be copied need not the authentication shade.

Figures 1, 2, 3, 4:
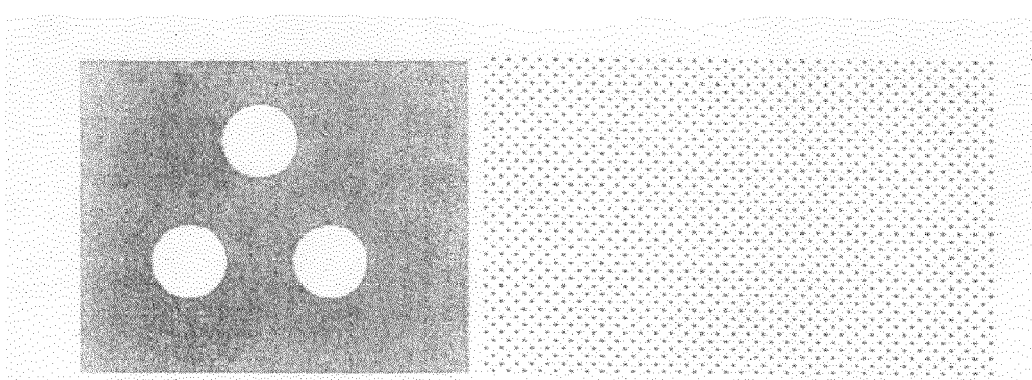
FIG. 1 is a schematic view of a basic mark according to Embodiment 1 of the present invention.
FIG. 2 is a schematic view of dots forming a background area.
FIG. 3 is an enlarged schematic view of a portion of authentication shade.
FIG. 4 is a schematic view of a copy-protected document.

The authentication shade in the copy-protected document now will be described in detail. The authentication shade used in the present invention comprises two parts—a background pattern area and a mark area. In this embodiment, a basic unit (i.e. a mark) of the mark area as shown in the FIG. 1 consists of three circles whose centers construct an equilateral triangle. Such pattern in FIG. 1 is the unit of the authentication mark for this embodiment. FIG. 2 shows a background pattern area of the authentication shade. The area is a halftone image after amplitude-modulation screening under the conditions of resolution of 600 dpi, screening at 45° and halftone count of 601 pi, the halftone image has a gray level of 5%, and the background area is formed by dots after screening. FIG. 3 shows the result of overlapping FIG. 2 with properly arranged basic units of FIG. 1. As shown in FIG. 3, for the authentication shade in the copy protected document, the basic units are filled in white. With the line width set to zero, the basic units are directly overlapped on to the background area in a certain arrangement. As a result, the basic shape of marks is shown by the filled white areas and the dots in the background area. Since the shape and positional relationship of the marks are the objects to be identified in the present invention, it is very important to identify the dots correctly. Based on the above conditions for screening, the restrictions for dots are as follow.

1) The gray level at the center of a dot is smaller than the gray levels of its 8 neighborhoods.
2) The gray level at the center of a dot is in a range of [m, n], wherein m and n are positive integers between 0 and 255, and m<n.
3) The gray level of a pixel with a certain distance from the central pixel should be larger than a predetermined threshold (Threshold1).
4) The gray level difference between the center of a dot and a pixel with a certain distance from the central pixel should be larger than a threshold (Threshold2).

The range for Threshold1 and Threshold2 can be determined dynamically due to the difference in density configuration for scanning images and to image process procedures which might be various for scanning.

In the process of scanning an image, if an area satisfies the above conditions, it can be viewed as a dot. If the area satisfies conditions 1, 3, and 4 and the value of the central pixel is greater than n, the area is a white dot; if the area satisfies conditions 1, 3, and 4 and the value of the central pixel is smaller than m, the area is a black dot or a boundary dot. Turning to FIG. 2, each dot has 4 closest dots located therearound. The scanning for an image is a process for continuously determining whether those areas are dots. This process requires constructing a two-dimensional array in the storage cell to store the scanning result. Each element in the array can be one of three different accessible values "0", "1", and "*", representing a white dot, a dot, and a black dot (or a boundary dot) respectively. By analyzing the array, the process could determine whether the document is copy-protected.

(2) When the original document is copied, a digitized image file of the original document is obtained by the copy apparatus.

(3) A program for detecting classified documents is run, which is fixed in the copy apparatus. The program may scan the digitized image file obtained in the step (2), and analyze whether any watermark is hidden in the document.

FIG. 4 is a view of a sample of the copy-protected document. Its substrate is laid with authentication shade as shown in FIG. 3, and a layer of normal document data is on the top of the authentication shade. A scan algorithm divides the image as shown in FIG. 4 into blocks. There might be too many factors interfering with the authentication shade in a certain block area, such as many words, tables, image, etc, so as to cause the mark area to be incomplete. Therefore, during the detection, such block area is discarded, and then the next block area is searched for to be scanned. To ensure the accuracy of the detected information, the size of a mark in the mark area is usually small, e.g. ¼ inch$^2$, so that a large number of marks are laid on the image plate. As a result, a block area without any interference by other factors might always be found. The analysis on the information detected from the block area can be used to check the existence of the mark, then in turn to determine whether the document is copy-protected. The method of scanning is described in detail below.

A) The scanning starts from the bottom-left corner of a specific block area, and all the image pixels are scanned in a conventional left-to-right, top-to-bottom manner. Determining whether there exists an image pixel as the center of a dot, if no dot is found in the block area, a similar scan will take place in the next block area. Further, if there is no dot found after the whole image is scanned, it can be concluded that the document is a general document.

B) If a detected dot satisfies the conditions, the central pixel of the dot is recorded as 0 in coordinates. Then, centered at 0, the scanning is continued outwards in an area with rectangular strip shape to detect whether there are 4 similar dots located around the dot. If there are no such 4 dots found, the dot is discarded and the scanning is continued to search for the next dot and make similar determination. After scanning, if still no dot is found or there are no other 4 dots surrounding the dot, it can be concluded that the document is a general document. If a satisfactory dot exists, the offsets from the central pixels of the other four dots to 0 are calculated and recorded as the following vectors respectively:

(FourDotAroundDotArrayX[i], FourDotAroundDotArrayY[i]), i=0, 1, 2, 3.

Figures 9, 10:
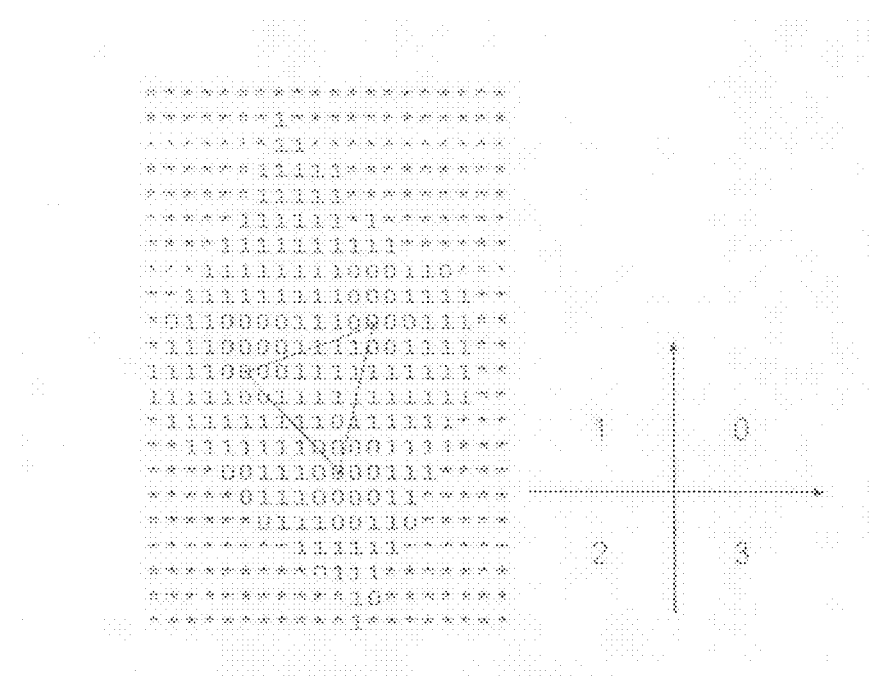
FIG. 9 is a schematic view of the array that is the result of scanning and detecting the FIG. 6.
FIG. 10 is a schematic view illustrating the scanning directions.

As shown in FIG. 10, the four vectors represents 0, 1, 3, 4 quadrants respectively.

The existence of the four offset vectors in a document indicates that the document has the background area of the authentication shade. Next, a special scanning method is employed and a corresponding two-dimensional array is constructed during the scanning. The steps are described in detail as below.

1) First, the bottom-left corner of an image block area is scanned to find a dot as a starting point and [0,0] of the corresponding two-dimensional array is marked as 1. Based on the starting point dot as the base point, the scanning performs to the next dot in the direction 0 shown in FIG. 10, and the corresponding offset is (FourDotAroundDotArrayX[0], FourDotAroundDotArrayY[0]). If the scanned dot is a black dot, [0, 1] is marked as 1, otherwise as 0. Then, the newly scanned dot becomes the base dot and the next dot to be scanned is found according to the relative position in the direction 0. Similarly, if the currently is scanned dot is a black dot, [2,0] is marked as 1, otherwise as 0. Accordingly, the starting row of the scanning array is obtained in this manner.

2) The central pixel of the starting dot is offset in the direction 1 as shown in FIG. 10 and the offset vector is (FourDotAroundDotArrayX[1], FourDotAroundDotArrayY[1]). Then the newly obtained pixel point becomes the new starting point and the process in the step 1) is repeated so as to obtain the row above the starting row of the array.

3) The process in the step 2) is repeated until the upper boundary of the image block area is scanned.

4) Accordingly, the central pixel of the starting dot is offset in the direction 3 as shown in FIG. 10 and the offset vector is (FourDotAroundDotArrayX[3], FourDotAroundDotArrayY[3]). Then, the process in the step 3) is repeated until the lower boundary of the image block area is scanned.

During scanning the image block area, a required two-dimensional array is constructed. FIG. 5 shows the effect of the partially enlarged view of FIG. 4. Using the method stated above, the view of FIG. 5 is scanned completely, with the resulting array shown in FIG. 7. As illustrated, the array has three connected-zones formed by 0 elements. The connected-zones are similar to a unit of the marks. Hence, the evaluation on the zones formed by 0 elements is required. Locating a zone formed by 0 elements in the array, if the zone forms a circle, the coordinates for the center of the circle is determined. Within a certain region, the centers of the other two circles are located in the same manner, and the coordinates of each center of the circles are recorded. Then, whether the triangle formed by the centers of the three circles as fixed points is an equilateral triangle is determined by using the coordinates of the three centers. If this is true, then there is a watermark in the authentication shade and the document is a copy-protected document.

In this embodiment, the analysis for FIG. 7 is shown in FIG. 8, wherein the three vertexes of the triangle are the centers of the three circles. Once the equilateral triangle formed by the centers of the three circles is validated, the document is determined to be a copy-protected classified document.

(4) The detecting result of the step (3) is fed back to the hardware controller in the copy apparatus. If the detecting result is positive for the watermark in the document, namely, the document is prohibited from copying, the hardware controller in the copy apparatus refuses to output the image file or output the image file after it is destroyed. If the detecting result is negative for the watermark in the document, namely, the document is allowed to be copied, the hardware controller in the copy apparatus outputs the image file normally so as to complete legitimate copying of the document.

Now the whole scanning and detecting process is completed. From the above description, it is obvious that the scanning process is very simple and there is no floating-point calculation or multiplication/division operation used. The detecting program can be fixed in hardware of the copy apparatus by ASIC design to achieve the effect of real-time detection.

Furthermore, the process for scanning dots in the present invention is non-traditional and the offset vectors are used during the dot offsetting. Therefore, after the scanning process of the present invention, the resulting array has the same arrangement of the dots, regardless of the original halftone angle. FIG. 6 shows the effect of turning FIG. 5 by 10 degrees. After performing the same scanning process, the resulting array is shown in FIG. 9. It is obvious that the result obtained from FIG. 9 is same as that from FIG. 8, namely, the document is a copy-protected classified document. As this result indicated, the placement angle of the original document does not matter to the detecting method in the present invention so that the defecting method can effectively avoid the interference from rotation during detection. Therefore, the present invention has greatly improved over the pattern matching method.

Moreover, the four offset vectors in the scanning process represent the changes of relative positions. When a document is enlarged or shrunk during being copied, although there are changes in the four offset vectors, the arrangement of the dots in the resulting array after scanning remains the same. As a result, the present invention prevents the negative effect of the zoom of the document, which the pattern matching method could not reach.

In the present invention, the detection program is easy to carry out and can be integrated in copy machines, scanners, facsimile machines, digital cameras and other advanced imaging devices.

Embodiment 2

Figure 11:
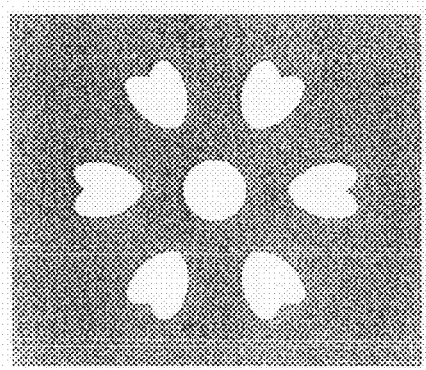
FIG. 11 is a schematic view of a basic mark according to Embodiment 2 of the present invention.

FIG. 11 shows the marks in this embodiment, it differs from the first embodiment in that the background pattern area of the authentication shade is a halftone image after amplitude-modulation screening under the conditions of resolution of 300 dpi, screening at 60° and halftone count of 301 pi, and the halftone image has a gray level of 20%.

Embodiment 3

Figure 12:
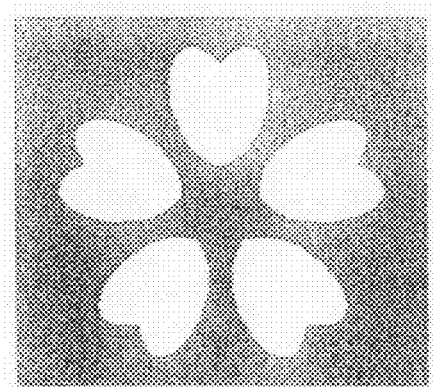
FIG. 12 is a schematic view of a basic mark according to Embodiment 3 of the present invention.

FIG. 12 shows the marks in this embodiment, it differs from the first embodiment in that the background pattern area of the authentication shade is a halftone image after amplitude-modulation screening under the conditions of resolution of 900 dpi, screening at 30° and halftone count of 901 pi, and the halftone image has a gray level of 10%.

The above steps are described for a preferred embodiment. It is possible for a person skilled in the art to obtain various embodiments, without departing from the spirit of the present invention, wherein
- the marks in the authentication shade can be designed in other specific manner;
- the background area of the authentication shade can be configured with different screening parameters;
- the specialized imaging device in the copy apparatus can be with higher resolution, such as 2400 dpi;
- different conditions can be used to determine the dots in the copy-protected shade; and
- different scanning manners can be employed to process the image area and the result after scanning can be recorded as a file.

The present invention is not limited to the above embodiments. Other embodiments obtained by the skilled in the art according to the technical solutions in the present invention should be within the scope of the technical innovation of the present invention.

The invention claimed is:

1. A method of document protection, comprising the steps of:
   (1) generating a document by forming a layer of authentication shade underneath an original image;
   (2) obtaining a digitized image file of the document by a copy apparatus when the document is processed for copying;
   (3) scanning the digitized image file to detect, by operating a program fixed in the copy apparatus, whether a watermark is included in the document; and
   (4) prohibiting the document from being copied if the watermark is detected in the step (3); or copying the document if no watermark is detected and outputting a duplicate document through a hardware controller of the copy apparatus, wherein the authentication shade includes a background pattern area and a mark area, the background pattern area is a halftone image, and the mark area is formed by repeating one mark on a whole page so that shapes and positions of the repeated marks constitute the watermark which is distributed in the document to be detected.

2. The method of claim 1, wherein the background pattern area of the authentication shade is a halftone image with a gray level in a range of 3% - 20%.

3. The method of claim 1, wherein the background pattern area of the authentication shade is a halftone image with a halftone count in a range of 301 pi - 901 pi.

4. The method of claim 1, wherein the program is fixed in the copy apparatus via an ASIC design, without needing a floating-point calculation and multiplication/division operation.

5. A method of document protection, comprising the steps of:
(1) generating a document by forming a layer of authentication shade underneath an original image;
(2) obtaining a digitized image file of the document by a copy apparatus when the document is processed for copying;
(3) scanning the digitized image file to detect, by operating a program fixed in the copy apparatus, whether a watermark is included in the document; and
(4) prohibiting the document from being copied if the watermark is detected in the step (3); or copying the document if no watermark is detected and outputting a duplicate document through a hardware controller of the copy apparatus,
wherein the step of scanning the digitized image file further comprises:
a) selecting a bottom-left corner of a specific image as a starting point to start scanning;
b) stopping detecting and concluding that no watermark exists in the document, if there is no dot detected;
c) scanning a region around a dot if the dot is detected;
d) stopping detecting and concluding that no watermark exists in the document if there are not four dots which are pairwise symmetrical about the detected dot;
e) recording offset vectors between the detected dot and each of the four dots, respectively, if there are four dots which are pairwise symmetrical about the detected dot; and
f) searching again for the starting point in the image and scanning the whole image in accordance with the four offset vectors, and then recording the detecting result in a storage cell.

6. The method of claim 5, wherein a position of each pixel is calculated in accordance with the four offset vectors in the step (3), and the pixel is determined as a dot, a white point or another point according to a gray level of the pixel, each of which is represented by one of three different symbols and written in the storage cell.

7. The method of claim 6, wherein the concluding step in the step (4) further comprises:
i) searching the storage cell for closed convex polygonal connected-zones formed by dots;
ii) recording center positions of all convex polygonal connected-zones; and
iii) identifying shapes of the convex polygonal connected-zones and positional relationship among the center positions to determine whether the watermark exists.

8. The method of claim 1, wherein, in the step (4), if the watermark exists, the hardware controller, instead of outputting the duplicate document, outputs a destroyed image file, or a file attached with evidence of illegal copying.

9. The method of claim 1, wherein the copy apparatus includes a specialized imaging device with a resolution of 300 dpi, 400 dpi, 600 dpi or 1200 dpi.

10. The method of claim 2, wherein the copy apparatus includes a specialized imaging device with a resolution of 300 dpi, 400 dpi, 600 dpi or 1200 dpi.

11. The method of claim 1, wherein the step of scanning the digitized image file further comprises:
a) selecting a bottom-left corner of a specific image as a starting point to start scanning;
b) stopping detecting and concluding that no watermark exists in the document, if there is no dot detected;
c) scanning a region around a dot if the dot is detected;
d) stopping detecting and concluding that no watermark exists in the document if there are not four dots which are pairwise symmetrical about the detected dot;
e) recording offset vectors between the detected dot and each of the four dots, respectively, if there are four dots which are pairwise symmetrical about the detected dot; and
f) searching again for the starting point in the image and scanning the whole image in accordance with the four offset vectors, and then recording the detecting result in a storage cell.

12. The method of claim 2, wherein the step of scanning the digitized image file further comprises:
a) selecting a bottom-left corner of a specific image as a starting point to start scanning;
b) stopping detecting and concluding that no watermark exists in the document, if there is no dot detected;
c) scanning a region around a dot if the dot is detected;
d) stopping detecting and concluding that no watermark exists in the document if there are not four dots which are pairwise symmetrical about the detected dot;
e) recording offset vectors between the detected dot and each of the four dots, respectively, if there are four dots which are pairwise symmetrical about the detected dot; and
f) searching again for the starting point in the image and scanning the whole image in accordance with the four offset vectors, and then recording the detecting result in a storage cell.

13. The method of claim 3, wherein the step of scanning the digitized image file further comprises:
a) selecting a bottom-left corner of a specific image as a starting point to start scanning;
b) stopping detecting and concluding that no watermark exists in the document, if there is no dot detected;
c) scanning a region around a dot if the dot is detected;
d) stopping detecting and concluding that no watermark exists in the document if there are not four dots which are pairwise symmetrical about the detected dot;
e) recording offset vectors between the detected dot and each of the four dots, respectively, if there are four dots which are pairwise symmetrical about the detected dot; and
searching again for the starting point in the image and scanning the whole image in accordance with the four offset vectors, and then recording the detecting result in a storage cell.

14. The method of claim 4, wherein the step of scanning the digitized image file further comprises:

a) selecting a bottom-left corner of a specific image as a starting point to start scanning;
b) stopping detecting and concluding that no watermark exists in the document, if there is no dot detected;
c) scanning a region around a dot if the dot is detected;
d) stopping detecting and concluding that no watermark exists in the document if there are not four dots which are pairwise symmetrical about the detected dot;
e) recording offset vectors between the detected dot and each of the four dots, respectively, if there are four dots which are pairwise symmetrical about the detected dot; and
f) searching again for the starting point in the image and scanning the whole image in accordance with the four offset vectors, and then recording the detecting result in a storage cell.

15. The method of claim 11, wherein a position of each pixel is calculated in accordance with the four offset vectors in the step (3), and the pixel is determined as a dot, a white point or another point according to a gray level of the pixel, each of which is represented by one of three different symbols and written in the storage cell.

16. The method of claim 12, wherein a position of each pixel is calculated in accordance with the four offset vectors in the step (3), and the pixel is determined as a dot, a white point or another point according to a gray level of the pixel, each of which is represented by one of three different symbols and written in the storage cell.

17. The method of claim 13, wherein a position of each pixel is calculated in accordance with the four offset vectors in the step (3), and the pixel is determined as a dot, a white point or another point according to a gray level of the pixel, each of which is represented by one of three different symbols and written in the storage cell.

18. The method of claim 14, wherein a position of each pixel is calculated in accordance with the four offset vectors in the step (3), and the pixel is determined as a dot, a white point or another point according to a gray level of the pixel, each of which is represented by one of three different symbols and written in the storage cell.

19. The method of claim 15, wherein the concluding step in the step (4) further comprises:
    i) searching the storage cell for closed convex polygonal connected-zones formed by dots;
    ii) recording center positions of all convex polygonal connected-zones; and
    iii) identifying shapes of the convex polygonal connected-zones and positional relationship among the center positions to determine whether the watermark exists.

20. The method of claim 16, wherein the concluding step in the step (4) further comprises:
    i) searching the storage cell for closed convex polygonal connected-zones formed by dots;
    ii) recording center positions of all convex polygonal connected-zones; and
    iii) identifying shapes of the convex polygonal connected-zones and positional relationship among the center positions to determine whether the watermark exists.

21. The method of claim 17, wherein the concluding step in the step (4) further comprises:
    i) searching the storage cell for closed convex polygonal connected-zones formed by dots;
    ii) recording center positions of all convex polygonal connected-zones; and
    iii) identifying shapes of the convex polygonal connected-zones and positional relationship among the center positions to determine whether the watermark exists.

22. The method of claim 18, wherein the concluding step in the step (4) further comprises:
    i) searching the storage cell for closed convex polygonal connected-zones formed by dots;
    ii) recording center positions of all convex polygonal connected-zones; and
    iii) identifying shapes of the convex polygonal connected-zones and positional relationship among the center positions to determine whether the watermark exists.

23. A method of detecting a copy-protected document, comprising:
    obtaining a digitized image file of a document by a copy apparatus when the document is processed for copying;
    detecting whether the document contains a layer of authentication shade, wherein the authentication shade includes a background pattern area and a mark area, the background pattern area is formed by dots, and the mark area is formed by marks such that shapes and positional relationships of the marks constitute a watermark to be detected, the detection of the layer of authentication shade comprising:
    selecting a portion of the digitized image file as a starting point to start dot scanning;
    if a dot is detected by the dot scanning, further scanning in an area surrounding the detected dot to detect whether there are other four dots located around the detected dot; if yes, recording four offset vectors between the detected dot and each of the other four dots, respectively; if no, discarding the detected dot and searching for another dot;
    if no dot is detected or no other four dots surrounding a dot is detected after the digitized image file is scanned, stopping detecting and concluding that no watermark exists in the document; and
    if the four offset vectors are obtained, scanning the whole digitized image according to the four directions of the four offset vectors, respectively, to obtain an array, wherein the array is a two-dimensional array constructed by symbols representing the dots and points forming the marks, respectively; and determining whether marks with specific shapes and positional relationships constituting a watermark exist in the array, so as to determine whether the watermark is included in the document; and prohibiting the document from being copied if the watermark is detected.

* * * * *